United States Patent [19]
Bertocci

[11] Patent Number: 5,953,656
[45] Date of Patent: Sep. 14, 1999

[54] METHOD AND APPARATUS FOR REMOTELY ACCESSING A TELEPHONE ANSWERING DEVICE

[75] Inventor: Guido Bertocci, Freehold, N.J.

[73] Assignee: Lucent Technologies Inc., Murray Hill, N.J.

[21] Appl. No.: 08/741,985

[22] Filed: Oct. 31, 1996

[51] Int. Cl.⁶ .............................. H04M 1/65; H04Q 7/20
[52] U.S. Cl. ............................................. 455/412; 455/569
[58] Field of Search ..................................... 455/412, 413, 455/415, 462, 569; 379/55.1, 56.1, 56.3

[56] References Cited

U.S. PATENT DOCUMENTS

| | | | |
|---|---|---|---|
| 5,073,928 | 12/1991 | Shimanuki | 455/412 |
| 5,317,624 | 5/1994 | Obana et al. | 455/412 |
| 5,687,218 | 11/1997 | Nakayama | 455/415 |

FOREIGN PATENT DOCUMENTS 0313776  5/1989  European Pat. Off. .

*Primary Examiner*—Andrew M. Dollnar
*Attorney, Agent, or Firm*—S. R. Williamson

[57] ABSTRACT

A cordless telephone provides both basic and enhanced features that are accessible through the combination of a portable unit and an auxiliary recharge cradle, some of these features being heretofore available only at a base unit which combines a cordless telephone fixed station and a telephone answering device. The cordless telephone includes a call screening feature which allows a user at the portable unit to monitor incoming messages received over telephone lines as they are being recorded at the telephone answering device. A loudspeaker is incorporated into the recharge cradle and, while the portable unit is in this recharge cradle, a user may configure the portable unit and cradle in a manner to monitor the incoming messages through the loudspeaker. An incoming message is received by the portable unit through a radio frequency link commonly shared by this unit and the base unit and then advantageously coupled from the portable unit via optical devices to amplifying circuitry in the recharge cradle for driving the loudspeaker. The amplifying circuitry is turned on upon receipt of the ringing signal by the portable unit. Once receipt of the incoming message is completed, the amplifier circuitry is turned off. The cordless telephone also includes a caller-ID feature which permits the user of the portable unit to selectably identify certain incoming messages for generation by the loudspeaker. In this aspect of the invention, the user of the portable unit is advantageously provided with incoming messages only from pre-identified calling parties and can listen to a message from one of these parties before the call is answered. This operation is achieved by the user entering into a memory table is the telephone each one of a plurality of desired telephone members for subsequent comparison with a caller ID number received from a calling party.

20 Claims, 7 Drawing Sheets

METHOD AND APPARATUS FOR REMOTELY ACCESSING A TELEPHONE ANSWERING DEVICE

BACKGROUND OF THE INVENTION

1. Technical Field

This invention relates to cordless telephones and, more particularly, to a cordless telephone which incorporates a telephone answering device interrogatable from a portable unit associated with said telephone.

2. Description of the Prior Art

Cordless telephone systems and telephone answering devices are both in wide use today in many businesses and homes. Both cordless telephone systems and telephone answering devices have specific or unique features and in different ways are very beneficial to a user. For example, a cordless telephone system, which includes a portable or handset unit and a base unit, permits a user to become untethered and move about freely in a business or at home. The greater mobility provided to a user of a cordless telephone system over, for example, a corded telephone system is readily apparent. And a telephone answering device is quite useful for a user in that it answers incoming calls and records messages when the user cannot or does not want to answer the telephone. The answering device may also note the day and time for each message and advantageously allows the user to retrieve his or her messages either when colocated with the answering device or located remote from such device.

Many arrangements are available today that integrate both cordless telephone systems and telephone answering devices. Three specific arrangements are respectively described in U.S. Pat. No. 4,677,655, U.S. Pat. No. 4,881,259 and U.S. Pat. No. 5,481,596. A cordless answering system is also commercially available from Lucent Technologies Inc. as Model Number 5635. Although flexibility and control are available in these integrated systems, such systems do not provide in the handset unit some features that are available in a combined cordless telephone base unit and telephone answering device. Moreover, such systems do not permit accessing information now generally available from a caller for assisting a user in deciding whether to answer or not answer an incoming call. For access to this information, a user would have to purchase another device and colocate it with the handset unit. Such device is usually expensive, however, and such purchase therefore undesirable. Thus, while the above arrangements have been generally satisfactory in the past, it is now technically feasible and desirable to provide an inexpensive, integrated cordless telephone and telephone answering device which permits a user to easily access at he portable unit both features and additional information present at the combined base unit and telephone answering device.

SUMMARY OF THE INVENTION

In accordance with the present invention, a cordless telephone provides both basic and enhanced features that are accessible through the combination of a portable unit and an auxiliary recharge cradle, some of these features being heretofore available only at a base unit which combines a cordless telephone fixed station and a telephone answering device.

The cordless telephone provides a call screening feature which allows a user at either the base unit or the portable unit to monitor incoming messages received over telephone lines as they are being recorded at the telephone answering device. In a first aspect of the invention, a loudspeaker is incorporated into the recharge cradle and, while the portable unit is in this recharge cradle, a user may configure the portable unit and the cradle in a manner to monitor the incoming message through the loudspeaker. The incoming message is received by the portable unit through a radio frequency link commonly shared by this unit and the base unit and then advantageously coupled from the portable unit to the loudspeaker via optical devices, in both the portable unit and the recharge cradle, and amplifying circuitry in the recharge cradle. The amplifying circuitry for driving the loudspeaker is turned on upon receipt by the portable unit of the ringing signal. Once receipt of the incoming message is completed, the amplifier circuitry is turned off.

In a second aspect of the invention, the cordless telephone includes a caller-ID feature which permits the user of the portable unit to selectably identify certain incoming messages for generation by the loudspeaker. In this aspect of the invention, the user of the portable unit is advantageously provided with incoming messages only from pre-identified calling parties and can listen to a message from one of these parties before the call is answered. This operation is achieved by the user entering into a memory table in the telephone each one of a plurality of desired telephone numbers for subsequent comparison with a caller-ID number received from a calling party. In response to a favorable comparison between the caller-ID number and any one of the stored telephone numbers, the incoming message being received over the telephone line is automatically generated in the loudspeaker in the recharge cradle.

BRIEF DESCRIPTION OF THE DRAWING

This invention and its mode of operation will be more clearly understood from the following detailed description when read with the appended drawing in which.

Throughout the drawings, the same element when shown in more than one figure is designated by the same reference numeral.

DETAILED DESCRIPTION

Figure 1:
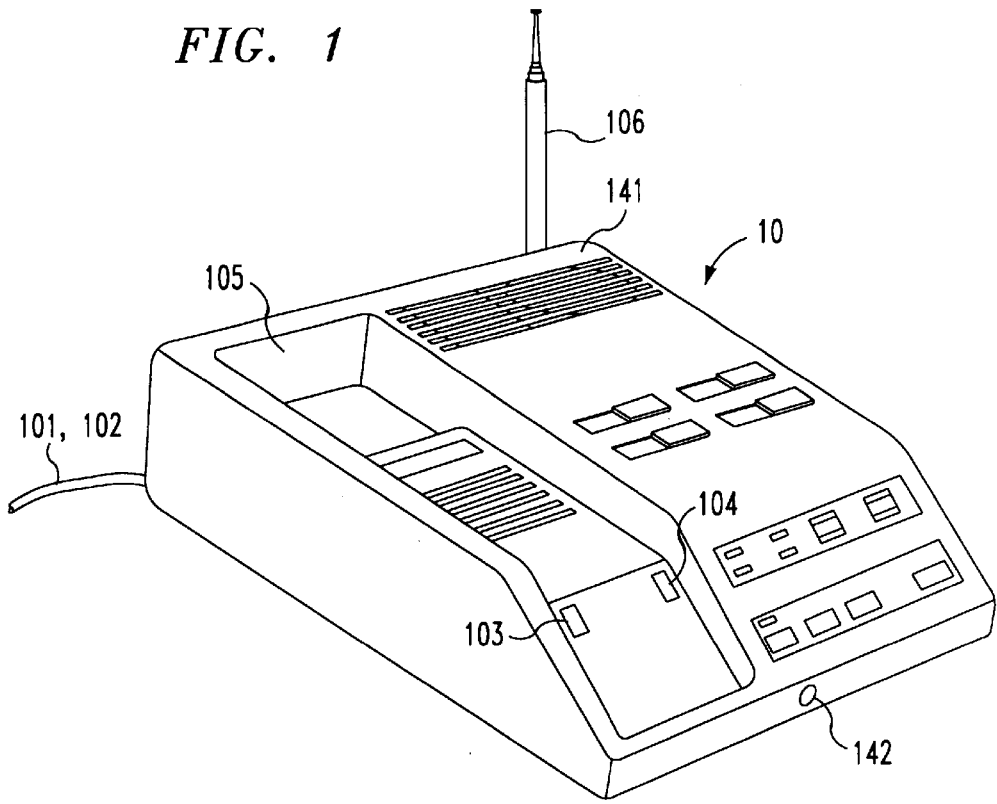
FIG. 1 shows a perspective view of a cordless telephone base unit and telephone answering device in combination, to which the present invention may be applied.
Figure 2:
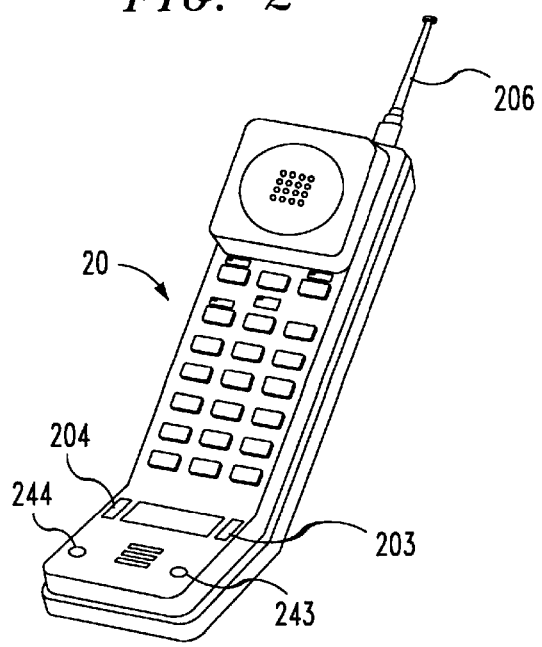
FIG. 2 shows a front perspective view of a cordless telephone portable unit to which the present invention may be applied.
Figure 3:
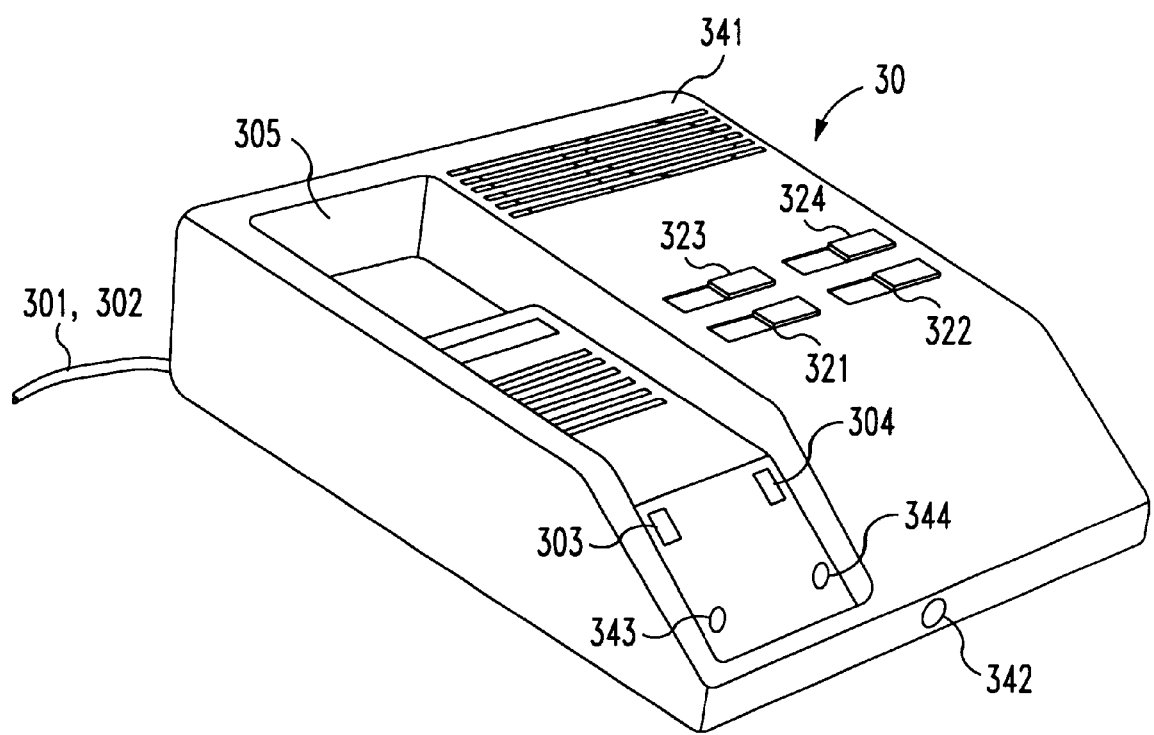
FIG. 3 shows a perspective view of a auxiliary charging cradle to which the present invention may be applied.

Referring now to FIGS. 1, 2 and 3 in combination, there is shown a communication system which includes a base unit 10, shown in FIG. 1, along with a portable transceiver or handset unit 20, shown in FIG. 2, with which the base unit 10 communicates. Also shown in FIG. 3 and also as a part of the system is a remote auxiliary charging cradle 30 for the handset unit 20. The base unit 10 includes both a telephone answering device (TAD) for automatically responding to incoming telephone calls and a fixed transceiver for communicating voice and TAD signals between the base unit 10 and the handset unit 20.

In the operation of this communication system, the base unit 10 transmits to and receives signals from the handset unit 20 over an antenna 106. The base unit also receives signals from and couples signals onto a telephone line 101, 102. The base unit, as more fully described later herein, through TAD circuitry incorporated therein, also answers calls, records messages when a user cannot or does not want to answer the telephone, and notes the time and day of each message. The TAD circuitry also is capable of recording memos and telephone conversations and permits a user to retrieve messages when the user is away from home. The handset unit transmits and receives signals over an antenna 206 and is used to contact base unit 10 for enabling the placing of a call over the telephone line 101, 102 as well as for accessing features and functions provided by the TAD circuitry located in the base unit.

The auxiliary charging cradle 30 provides a source of energy for charging the handset unit 20 and also permits the handset unit to receive and respond to ringing signals while located in this cradle. Such operation is achieved through a cycling scheme which controls the period over which the source of energy from the auxiliary charging cradle 30 is applied to the handset unit 20. By applying this source of energy periodically and then only for relatively short periods of time, the handset unit 20 is able to sense a radio frequency ringing signal generated by the base unit 10 during those periods when the source of energy is not being applied by the auxiliary charging cradle and respond to the radio frequency ringing signal. A remote auxiliary charging cradle suitable for use as charging cradle 30 is described in U.S. Pat. No. 5,371,784.

While the handset unit 20 is located in a mating cradle 305 in the auxiliary charging cradle 30, audio signals, including speech and unique digital command information codes may be coupled between the handset unit and the charging cradle 30. This interface is achieved through a light source 243 and detector 244 on the handset unit 20 which respectively interface with a light detector 343 and light source 344 on the auxiliary charging cradle 30. This operation is described in greater detail later herein with reference to FIGS. 4 and 5.

In order to prevent an unauthorized user in possession of a handset unit from obtaining access to base unit 10, a randomly generated security code stored in base unit 10 is transferred to handset unit 20 while the handset unit is located in a mating cradle 105 in the base unit 10. A battery, which allows operation of the handset unit 20 while remote from either the base unit 10 or the auxiliary charging cradle 30, is normally charged when the handset unit 20 is placed in either the base unit cradle 105 or the cradle 305 of the charging cradle 30. This battery is described later herein with reference to FIG. 4. A direct-current charging path for the battery is established over contacts 103 and 104 in the base unit 10 and contacts 203 and 204 in the handset unit 20 for charging of the battery. These contacts also allow transfer circuits in the base unit 10 and the handset unit 20 to respectively transmit and receive the security code and also an operating frequency channel over this path. A format suitable for transferring of the security code and other data over a direct-current charging path is described in U.S. Pat. No. 4,736,404 issued to R. E. Anglikowski et al. on Apr. 5, 1988. While the handset unit is in the auxiliary charging cradle 30, a direct-current charging path for the battery is established over contacts 303 and 304 in the auxiliary charging cradle 30 and contacts 203 and 204 in the handset unit 20 for charging of the battery.

In the handset unit 20, a controlled power-up/power-down mode of operation is implemented. Power to a radio receiver, a control unit and certain other selected circuitry in the handset unit 20 are controlled to minimize power consumption when the handset unit 20 is in a standby-and-out-of-cradle state. The handset unit 20 resides in this state while not being used by a user in communicating with the base unit 10. Power to other non-essential circuitry in the handset unit is turned completely off during this power saving state.

During the power-up/power-down (battery saver) mode of operation, multiple events can cause the control unit to turn on to a full operating mode from the alternating power-up/power-down mode. A key depression on the handset unit, detection of a digitally formatted radio signal transmitted from the base unit 10, and the handset unit 20 being cradled in the base unit 10 for charging are all events which cause the control unit in the handset unit 20 to turn on to and remain in the full operating mode until processing of these events is completed.

A message format for the radio signals transmitted between the base unit and the handset unit is provided in the form of frequency shift keyed (FSK) signals and includes a data field. This data field may be in the form of either command opcode data or dial digit data, thereby allowing for many different commands or functions. The message format also includes a synchronizing header signal that immediately precedes the data field. A format suitable for transmission of the data messages between the base unit 10 and the handset unit 20 is described in U.S. Pat. No. 4,731,814 which issued to W. R. Becker et al. on Mar. 15, 1988.

Any communications between the base unit and the handset unit are established first through interpretation of the data field in the FSK signals. By way of example, when the base unit receives the incoming ringing signal on the telephone lines, it transmits the FSK signal with the ring-on opcode to the handset unit for changing the handset unit 20 from the alternating power-up/power-down mode to the full operating mode. But before the handset unit will respond to the base unit, the security code that the handset unit recognizes also must be in the data field received by the handset unit.

When a signal is transmitted on the frequency on which the handset unit 20 is monitoring, the handset unit receiver turns on and remains on long enough to receive and interpret the security code transmitted by a base unit on this frequency. The security code identifies the transmitting base unit as being the correct base unit to which the handset unit should respond. All other signals received on this frequency without a security code that the handset unit recognizes are ignored. Once the handset unit has verified that the signaling base unit has the proper security code, it turns on to a full operating mode, in this instance the PHONE mode. If the handset unit does not recognize the code being transmitted by the base unit, it leaves the full operating mode and returns to the power-up/power-down mode of operation. This common security code is also included in any transmission of the FSK signals from the handset unit to the base unit and must similarly identify the handset unit as being the correct handset unit to which the base unit should respond. The handset unit receiver also remains on for approximately 10 seconds whenever a user goes on-hook at the handset unit, i.e., terminates the interaction with or through the base unit while in the PHONE mode, INTERCOM mode or TAD interrogation mode.

The communication system includes a call screening feature operable from the handset unit 20 or from the remote auxiliary charging cradle 30. In essence, this feature, in a first configuration, allows a user holding the handset unit 20 or at the charging cradle 30 to monitor at one or the other of these units incoming messages received over telephone lines as they are being recorded, without interrupting the recording action of the TAD in the base unit 10 and without directly connecting the user to the calling party. This functionality is invoked via a first selection button (not shown) on the handset unit which transmits a first unique digital command information code from the handset unit to the base unit 10. This functionality is similarly invoked via a selection switch 421 on the charging cradle 30 which also causes the first unique digital command information code to be transmitted from the handset unit 20 to the base unit 10. This command information code causes the base unit 10 to transmit on the frequency which the handset unit 20 is then monitoring the prerecorded message that is outgoing over the telephone lines and also any message that is incoming over the telephone lines.

A user at the handset unit, or the handset unit and charging cradle combination, may end the monitoring of an incoming message either by answering the call or without answering the call. To answer the call and speak to the calling party when the handset unit is away from the base unit and charging cradle, the user depresses a second selection button (not shown) on the handset unit which transmits a second unique digital command information code from the handset unit to the processor in the cordless telephone base unit. Or if the handset unit is cradled in the charging cradle and the user wishes to speak to the calling party using the handset unit, the user merely lifts this handset unit and begin speaking to the calling party using the handset unit. When the handset unit is located in the cradle of the charging unit and the user wishes to converse with the calling party using the speakerphone in the charging cradle, the user actuates a second selection switch 422 on the charging cradle 30 which also causes the second unique digital command information code to be transmitted from the handset unit 20 to the base unit 10. At this point, the user is able to speak to the calling party over the speakerphone circuitry located in the recharge cradle.

When this second information code is received in the base unit 10, the TAD stops playing the prerecorded outgoing message or recording any incoming message, and both the RF transmitter and the RF receiver in the base unit remain activated for enabling the user at the handset unit to communicate with the calling party.

For ending the monitoring of incoming messages without answering the call, the user depresses a third selection button on the handset unit or actuates a third selection switch 423 on the auxiliary cradle, either of which transmits a third unique digital command information code from the handset unit to deactivate the RF transmitter in the base unit.

Figure 5:
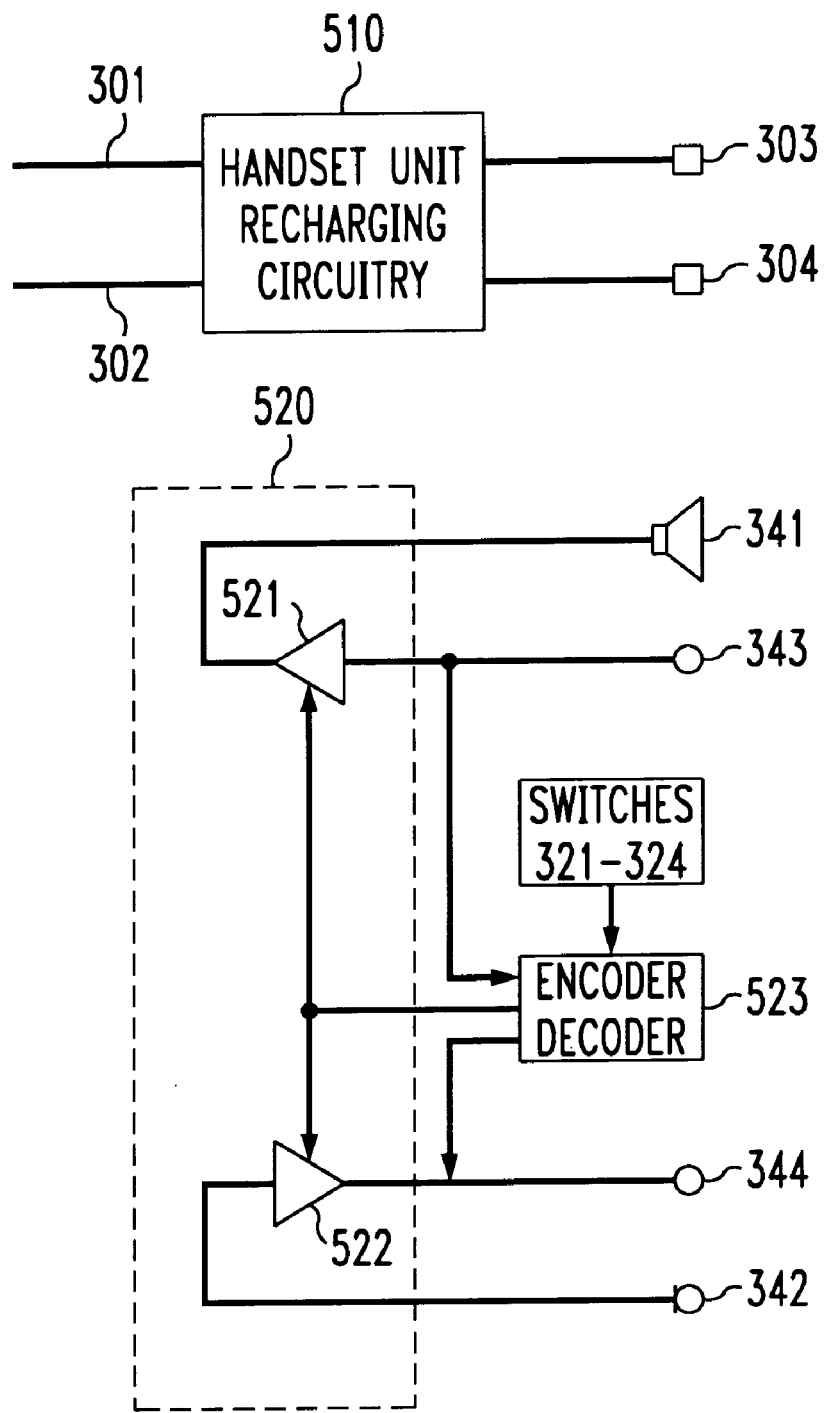
FIG. 5 is a functional block representation of the auxiliary charging cradle of FIG. 3, operative in accordance with the principles of the present invention.

In accordance with a disclosed embodiment of the invention, an additional level of convenience in operating the call screening feature is provided when the handset unit 20 is located remote from the base unit 10 and also located in the auxiliary charging cradle. This feature, in a second configuration, i.e., auto monitor feature, allows the user of the handset unit to monitor at the auxiliary charging cradle incoming messages received over telephone lines as they are being recorded without the user having to configure the handset unit or auxiliary charging cradle in any way during actual receipt of the message. A built-in loudspeaker 341, shown in both FIGS. 3 and 5, is incorporated into the auxiliary charging cradle 30 for audibly reproducing the incoming message that is transmitted to the handset unit from the base unit 10.

When the base unit 10 answers an incoming call, the loudspeaker 341 is optionally preconfigurable to automatically turn-on during the operation of the TAD circuitry. Once receipt of the incoming message is completed, as reflected by the TAD circuitry, amplifier circuitry in the auxiliary cradle driving the loudspeaker is turned off. This operation is explained in greater detail later herein, with reference to FIG. 5.

While the call screening feature at the handset unit is operating in the second configuration, i.e., combination of handset and auxiliary charging cradle performs call screening automatically without assistance from the user, a user at the handset unit may end the monitoring of an incoming message by answering the call with the handset unit. This is achieved by the user either lifting the handset unit from the charging cradle and speaking to the calling party through the handset unit or depresses the second selection button on the charging cradle, both of which transmit the second unique digital command information code from the handset unit to the processor in the cordless telephone base unit. When this information code is received in the base unit 10, the TAD circuitry stops playing the prerecorded outgoing message or recording any incoming message, and both the RF transmitter and the RF receiver in the base unit remain activated for enabling the user at the handset unit to communicate with the calling party.

Figure 4:
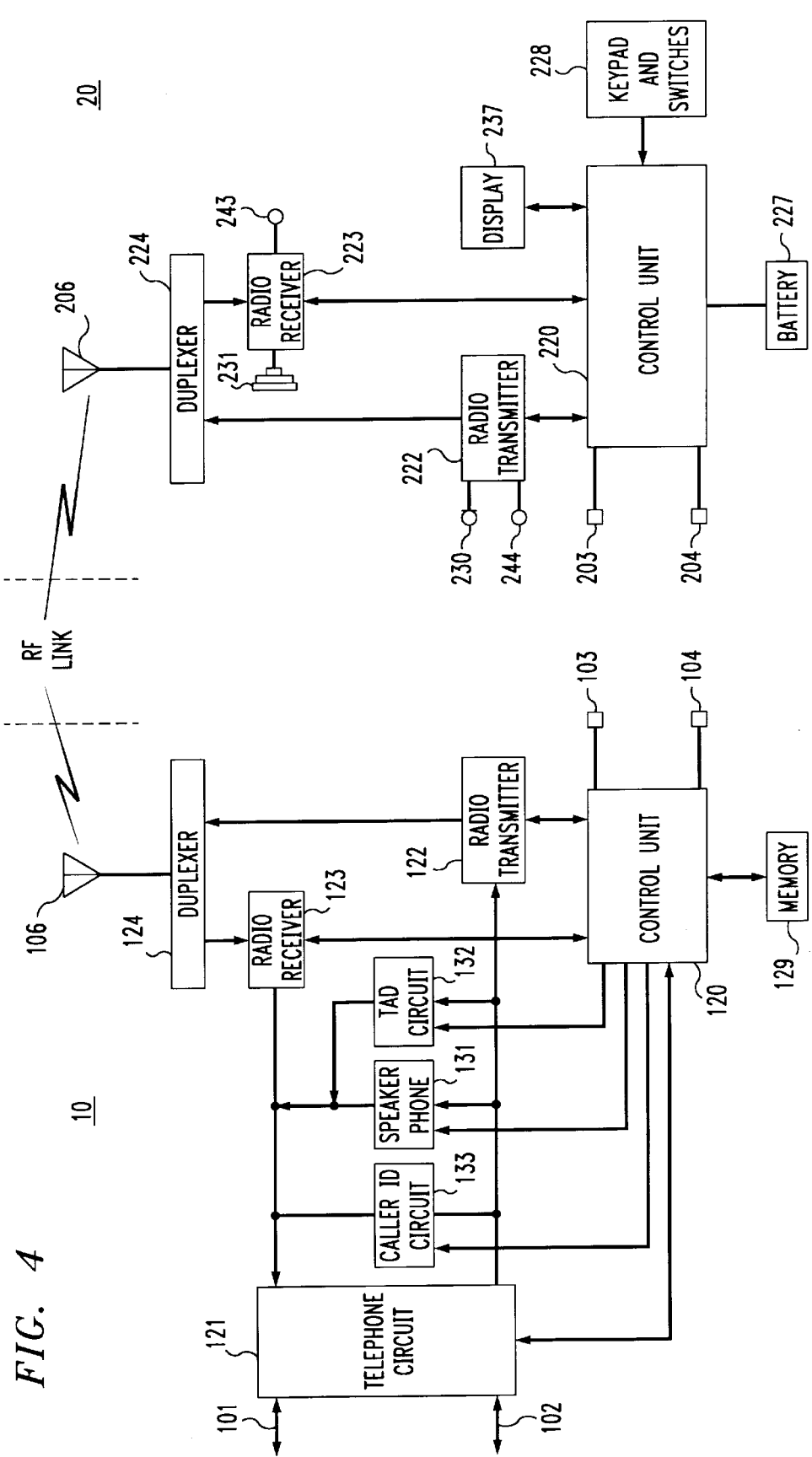
FIG. 4 is a functional block representation of the cordless telephone base unit and telephone answering device of FIG. 1 in combination, and also the cordless telephone portable unit of FIGS. 2 and 8, operative in accordance with the principles of the present invention.
Figure 7:
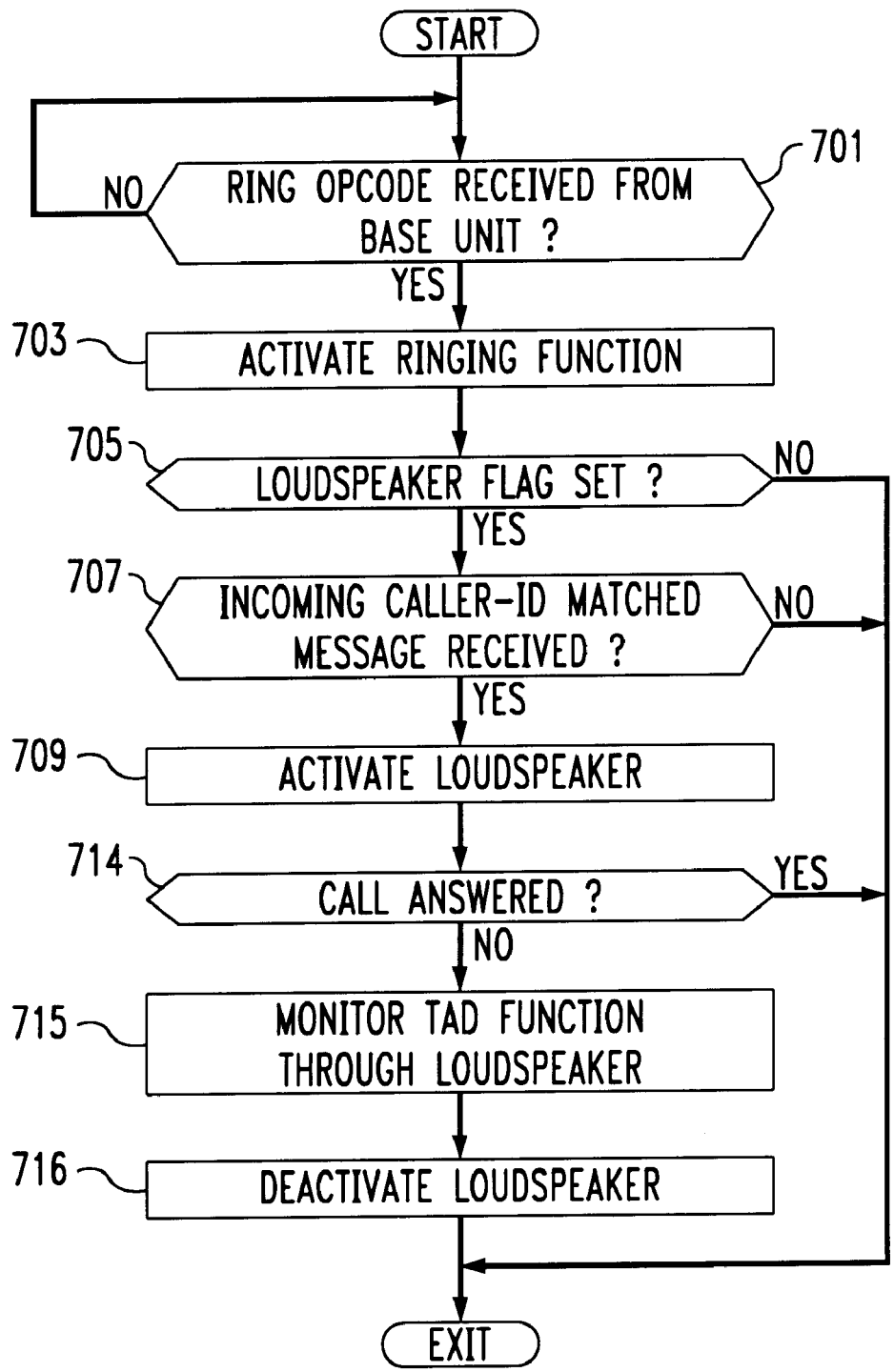
FIG. 7 shows a flow chart for illustrating the operation of the base unit with the desired functionality in accessing the telephone answering device functions.
Figure 8:
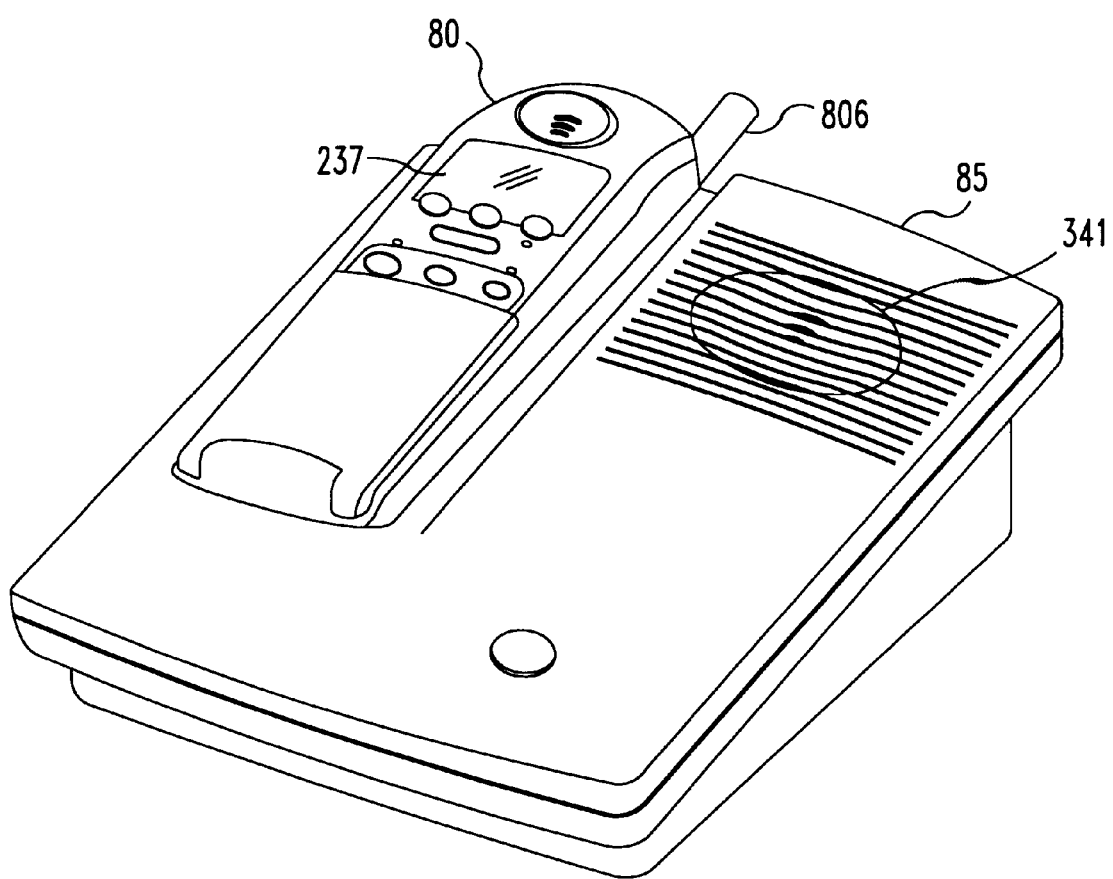
FIG. 8 shows a front perspective view of an alternative portable unit and auxiliary charging cradle to which the present invention may be applied.

Referring next to FIG. 4, there is shown a block representation of the major functional components of the base unit 10 and also of the handset unit 20, the base unit being depicted in FIG. 1, a first handset unit being depicted in FIG. 2, and an alternative handset unit being depicted in both FIGS. 7 and 8, these units all being operative over a plurality of communication channels.

Included in the base unit 10 is a control unit 120 which advantageously provides a number of control functions. The control unit 120 generates security code and frequency channel data, which includes data indicative of an active channel selected by the base unit 10 and initially communicated to the handset unit 20 over the charge contact interface 103, 104, 203, and 204 or subsequently over the radio frequency (RF) link as needed to avoid interference. An arrangement suitable for use in selecting an active channel free of interference is described in U.S. Pat. No. 5,044,010 which issued to R. Frenkiel on Aug. 27, 1991, this patent being incorporated herein by reference.

Speakerphone 131 and TAD circuit 132 are advantageously included in the base unit 10 for providing additional functions and features for this unit. Circuitry suitable for use in speakerphone 131 is commercially available from Lucent Technologies Inc. as either speakerphone Model S201 or speakerphone Model 870. This speakerphone circuitry is also suitably described in U.S. Pat. Nos. 4,887,288, 4,901, 346 and 4,959,887.

TAD circuitry has previously been incorporated into cordless telephones. Two such examples are respectively described in U.S. Pat. Nos. 4,677,655 and 4,881,259. Also a cordless answering system Model 5635, commercially available from Lucent Technologies Inc. incorporates circuitry suitable for use in base unit 10 including, with some modifications which are fully disclosed herein, TAD circuit 132. Additional circuitry suitable for use in TAD circuit 132 is commercially available from Lucent Technologies Inc. in digital answering systems, Models 1343, 1545, 1710, 1756 and 1830, for example. A conventional power supply (not shown) provides operating power for all of the circuitry in the base unit 10.

As earlier indicated, the communication system includes a call screening feature operable in accordance with the disclosed embodiment in the first configuration by the user while holding the handset unit 20 or while this unit is cradled in the auxiliary charging cradle, or also operable in the second configuration automatically without assistance from the user.

In the execution of the call screening feature, while in the first configuration, the control unit 120 interprets the first unique digital command information code received from the handset unit 20 and causes the radio transmitter 122 in the base unit to become activated for transmitting directly to the handset unit a prerecorded message that is outgoing over the telephone lines and any message that is incoming over the telephone lines. Thus, the user of the handset may monitor an incoming message at the handset unit by depressing the first selection button (not shown) on the handset unit while holding this unit, or depressing the switch 421 on the auxiliary charging cradle, both of which transmits the first unique digital command information code from the handset unit to the base unit 10.

A user at the handset unit, or the handset unit and auxiliary cradle in combination, may end the monitoring of an incoming message either by answering the call or without answering the call. Upon the user depressing the second selection button on the handset unit, while holding this unit, or the switch 422 on the auxiliary cradle, while the handset unit is nested in this cradle, either action being suitable for answering the call, the second unique digital command information code is transmitted from the handset unit and received by the control unit 120 in the base unit 10. Once the information code is received, the control unit causes the TAD circuit 132 to stop playing the prerecorded outgoing message or recording any incoming message, and also keeps activated both the RF transmitter and the RF receiver in the base unit for enabling the user at the handset unit to communicate with the calling party.

When the user at the handset unit, while holding this unit, desires to end the monitoring of incoming messages without answering the call, the user depresses the third selection button on the handset unit, or the switch 423 on the auxiliary cradle while the handset unit is in this cradle, both actions suitably transmitting the third unique digital command information code from the handset unit to the base unit. This information code causes the control unit 120 to deactivate the RF transmitter in the base unit.

As earlier indicated herein, an additional level of convenience in operating the call screening feature from the handset unit 20 and auxiliary charging cradle combination is provided for the user of these units. This call screening feature, while in the second configuration, allows the user at the handset unit/auxiliary charging cradle combination to monitor incoming messages received over telephone lines as they are being recorded without the user having to configure the handset unit and/or auxiliary cradle in any way during the receipt of the message. The built-in loudspeaker 341 in the auxiliary charging cradle 30 audibly reproduces the incoming message in the charging cradle when the TAD circuitry 132 in the base unit 10 answers an incoming call.

A fourth unique digital information code is transmitted from the base unit to the handset unit when the TAD circuit 132 goes off-hook to answer the incoming call. Upon receipt of this fourth unique digital information code by the control unit 220, this control unit determines whether a call monitoring flag is set or not set in memory in the handset unit.

If the call monitoring flag is set, amplifier circuitry in the charging cradle 30 for operating the loudspeaker 341 is automatically turned on by the control unit 220 in the handset unit 20 and allows the handset user to conveniently monitor the incoming message without manually manipulating the handset unit or charging cradle 30 in any way during the operation of the TAD circuit 132. Once receipt of the incoming message is completed, as reflected by transmission of a fifth unique digital information code from the base unit when the TAD circuit 132 goes on-hook, the amplifier circuitry driving the loudspeaker is turned off.

A user at the handset unit may end the monitoring of an incoming message, while the call screening feature is in the second configuration, by answering the call. Upon the user removing the handset unit 20 from the cradle 30, or depressing the switch 322, either of which answers the call, the second unique digital command information code is transmitted from the handset unit and received by the control unit 120 in the base unit 10. Once the information code is received, the control unit causes the TAD circuit 132 to stop playing the prerecorded outgoing message or recording any incoming message, and keeps activated both the RF transmitter 122 and the RF receiver 123 in the base unit for enabling the user at the handset unit to communicate with the calling party.

The user of the handset unit also may desire to end monitoring of the incoming message without answering the call, while the call screening feature at the handset unit/charging cradle combination is operating in the second configuration. In performing this operation, the user depresses the third selection switch 323 on the charging cradle which transmits the third unique digital command information code from the handset unit to the base unit. This information code causes the control unit 120 to deactivate the RF transmitter 122 in the base unit 10. Depression of a fourth selection switch 324 on the charging cradle 30 configures the TAD circuit 132 to play all recorded incoming messages.

The security code data, transmitted from the base unit 10 to the handset unit 20 via the battery charge contact interface that may be established between these two units, is transmitted while establishing initial communications or call set-up during the time that the handset unit 20 is located remote from the base unit 10 as well as during the transfer of subsequent opcode data between these units during ongoing communications. This control unit 120 compares the received security code data with its stored security code data during the establishing of the two-way RF communications link between the handset unit 20 and the base unit 10. A favorable comparison of the data from the two security codes must be achieved in order for the base unit 10 to respond to a request-for-service signal from a handset unit. This control unit 120 also receives and processes opcode data provided by the handset unit 20 for dialing and providing signaling information out to a central office or other appropriate switch via a telephone circuit 121 and over tip-ring lines 101 and 102. Control unit 120 may be implemented through the use of a microcomputer containing ROM, RAM and through use of the proper coding. Such a microcomputer is known in the art and is readily available from semiconductor manufacturers such as Signetics, Intel and AMD. The telephone circuit 121 serves as a "plain old telephone service" (POTS) interface for voice signals on the tip-ring lines 101 and 102 which are sent to radio transmitter 122, speakerphone 131, and TAD circuit 132. And voice signals from the radio receiver 123, speakerphone 131, and TAD circuit 132 are received by the telephone circuit 121.

Both the base unit 10 and the handset unit 20 are operable on a plurality of communication channels. The control unit 120 configures the radio transmitter 122 and the radio receiver 123 in the base unit 10 for proper operation on the active one of the plurality of channels when communicating with handset unit 20.

The transmit and receive signals of the base unit 10 are coupled to a duplexer 124 which permits the radio transmitter 122 and the radio receiver 123 to both simultaneously operate over antenna 106 while preventing the output of transmitter 122 from being coupled directly to the input of the receiver 123. When the base unit is in an idle state awaiting an incoming telephone call or a request-for-service signal from the handset unit, transmitter 122 is turned off while receiver 123 remains on to detect the request-for-service signal.

A caller-ID circuit 133 along with the control unit 120 performs the caller-ID function such as described in U.S. Pat. No. 5,377,261 as part of an alerting process available to the user of the handset unit. In executing this process, a name and the receivable caller-ID telephone number, including the area code, are stored into memory. Such memory storage is provided in memory 129 which may be either random-access-memory (RAM) or electrical erasable-read-only-memory (EEPROM). Through use of this caller-ID information received over the telephone line 101, 102, the user is informed of the identity of the calling party before the call is answered. For achieving this operation, the user configures the memory by entering each of "N" desired telephone numbers, typically 10, into the memory table for subsequent access and comparison by the control unit 120 when a caller-ID number is received from a calling party. Although the number 10 is suggested as being typical for N, it is understood that N may be either less than or greater than this suggested value.

A voice help menu advantageously provides coding instructions and guides the user through the correct steps necessary to configure the memory 129 in the base unit 10 with the table of caller-ID numbers. The voice help menu is accessed by pressing a designated button and obtaining a 2-beep signal to indicate to the user that the system is ready to accept a command. The commands are usually accessed by pressing a number which represents a particular function. For example, the user, after entering the voice help menu, might hear "to play all messages, press 1," or "to play new messages, press 2," or "to program caller-ID numbers, press 9."

Referring next to the handset unit 20, there is shown the control unit 220 which stores the security code data that is generated by the base unit 10 and provided to the handset unit 20. This security code data stored in control unit 220 is transmitted from the handset unit 20 to the base unit 10 while establishing initial communications through a request for service signal as well as during the transfer of subsequent opcode data to the base unit. These signals are transmitted in a frequency shift keying (FSK) format and include a synchronizing signal immediately followed by a data field which includes the security code generated by the control unit 120. Like the control unit 120, this control unit 220 may be implemented through the use of a microcomputer containing ROM, RAM and through use of the proper coding. Such a microcomputer is known in the art and is readily available from semiconductor manufacturers such as Signetics, Intel and AMD.

Communications with the base unit 10 are provided via a radio transmitter 222 and a radio receiver 223 in the handset unit 20. The output of the transmitter 222 and input for the receiver 223 are commonly coupled through a duplexer 224 to an antenna 206. The receiver 223 demodulates voice signals transmitted by the base unit 10 and selectively, under the control of the control unit 220, couples these signals to either the acoustic receiver 231 or the light source 243 which interfaces with a light detector 343 in the auxiliary charging cradle 30. In the charging cradle, these signals are coupled to the acoustical loudspeaking device such as, for example, loudspeaker 341. The transmitter 222 has as a selectable input, speech signals from a microphone 230, security code data from control unit 220, and opcode data representative of entries on a keypad 228, all of which it transmits to the base unit 10. The transmitter 222 also has as one of its selectable inputs, speech signals from a microphone 342, and unique digital command information codes that are transmitted via light source 344 in the charging cradle 30 and received by light detector 244 in the handset unit 20. The transmitter 222 also transmits these signals to the base unit 10.

A keypad 228 in the handset unit 20 is used for entering dial digits and control functions executable by the control unit 220 or transmitted to the base unit 10. The keypad 228 is also used for accessing features provided by the TAD circuit 132 in the base unit 10. Such features include call screening allowing for automatically as well as manually monitoring an incoming message, playing messages, saving messages and clearing messages. A battery 227 is also included in the handset unit 20 for providing operating power for all circuitry in this unit.

An optional display 237 in a handset unit provides an alternative way to that provided by the voice help menu for programming telephone numbers of interest into the caller-ID table located in memory 129. Such an optional display is illustratively shown in the telephone handset unit 80 of FIG. 8. Other features of handset unit 80, however, are similar to those described for handset unit 20.

In utilizing the optional display 237, the user activates the number entry process by depressing a designated button on the handset unit. This designated button then causes the display to cycle through menu screens provided on the display. Once the number entry process is activated, the user is queried by the display for each of the numbers to be entered into the caller-ID table. In response to this query, the user enters each number into the table, this number being visible in the display 237. When the user is queried as to whether to have the auto monitor feature (speakerphone at handset is activated and automatically monitors incoming calls) on or off, the user simply responds to a yes or no query prompt on the display and the auto monitor feature flag is either set or not set.

In order to conserve battery power, a controlled power-up/power-down mode of operation for the handset unit 20 is implemented in accordance with the teachings of U.S. Pat. No. 4,731,814 which issued to W. R. Becker et al. The battery 227 in the handset unit 20 is normally charged while the handset unit is placed in the cradle of the base unit. When the handset unit is removed from the base unit and is in an idle or standby state awaiting a telephone call, power to the control unit 220, receiver 223 and certain other selected circuitry in the handset unit 20 is controlled to minimize power consumption. Power to other non-essential circuitry in the handset unit 20 is turned completely off during this state. The handset unit automatically turns on to a full operating mode from the controlled power-up/power-down mode in response to events such as a user depressing a key on the keypad 228 or the receipt of a ring indication from a base unit, the ring indication being indicative of an incoming call directed to the handset unit.

Referring next to FIG. 5, there is shown a block representation of the major functional components of the remote auxiliary charging cradle 30. Included in the charging cradle 30 is handset unit recharging circuitry 510 which connects to line power for providing the charging current for the handset unit 20 over charge contacts 303 and 304. Such circuitry is described in U.S. Pat. No. 5,371,784, incorporated herein by reference.

Also included in the charging cradle 30 is amplifying circuitry 520 for providing the speakerphone functionality in this unit. The amplifying circuitry 520 includes an amplifier 521 for receiving and amplifying the audio signals detected by optical detector 343, which operates preferably in the infrared range. Optical detectors are known in the art. Examples of optical detectors are photoconductive cells, photodiodes, phototransistors, photovoltaic cells and pin diodes. From the amplifier 521, the audio signals are coupled to the loudspeaker 341.

The amplifying circuitry 520 also includes an amplifier 522 for receiving and amplifying the audio signals from microphone 342. From the amplifier 522, the audio signals are coupled to the handset unit via light source 344, which emits light at a wave length preferably in the infrared range. Light sources are known in the art. Examples of light sources are gallium arsenide, gallium arsenide phosphide and gallium phosphide light-emitting diodes. Circuitry suitable for use as the amplifying circuitry 520 and also providing the speakerphone functionality is suitably described in U.S. Pat. Nos. 4,887,288, 4,901,346 and 4,959,887.

Also included in the remote auxiliary charging cradle are switches 321 through 324 which are actuatable for generating in an encoder/decoder 523 a series of unique digital command information codes that are transmitted via light source 344 to the handset unit 20. Similarly, the encoder/decoder 523 receives a series of unique digital command information codes from the handset unit 20 via optical detector 343 for respectively configuring the amplifiers 521 and 522 in the amplifying circuitry 520. Encoder/decoder 523 may range from a simple tone detector/generator to a small microcontroller or digital signal processor, depending upon the particular design requirements. All of these devices are readily available in the art.

Figure 6:
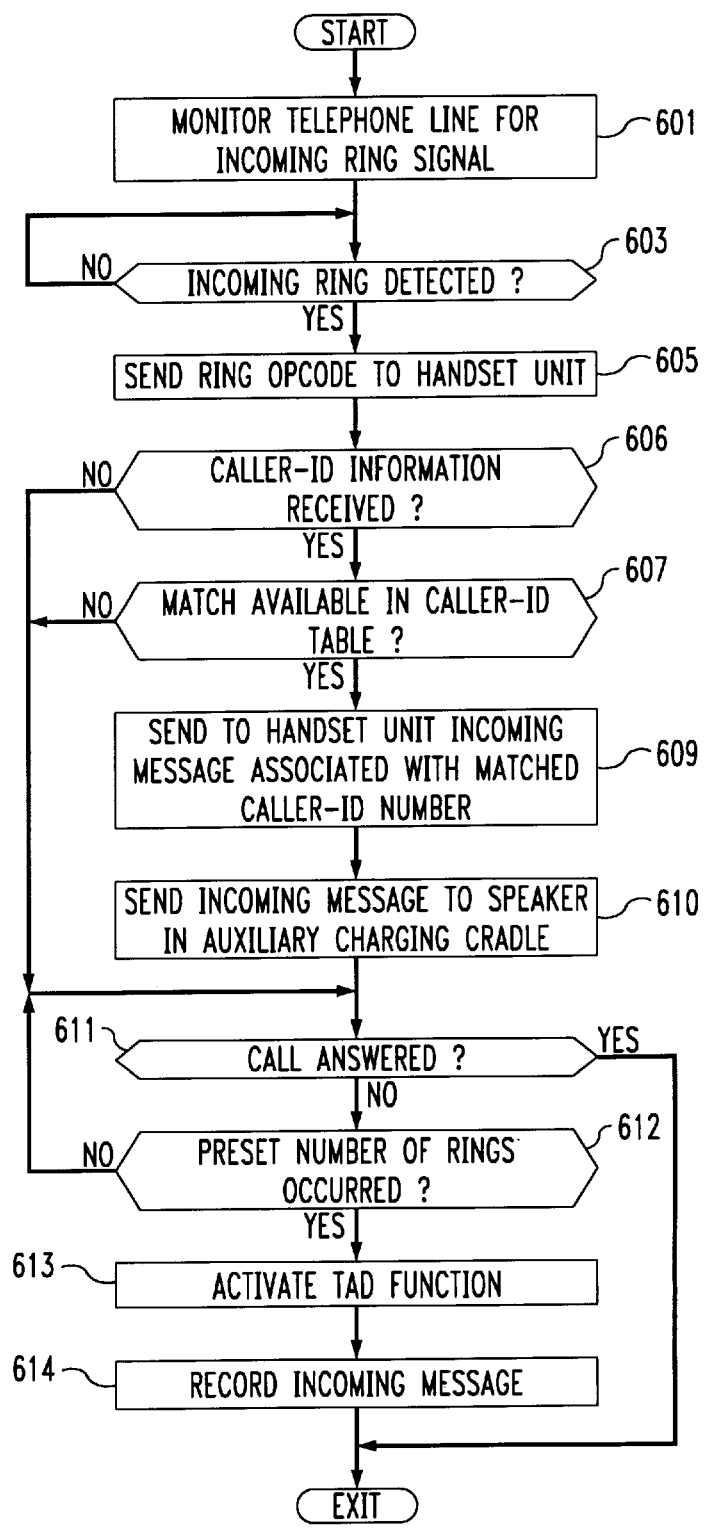
FIG. 6 shows a flow chart for illustrating the operation of the cordless telephone with the desired functionality in the execution of the telephone answering device functions.

Referring next to FIG. 6, there is shown a flow chart for illustrating the operation of the base unit in the communication system for providing the desired functionality in the execution of the TAD functions. The functions in this flow chart are advantageously provided by a process or program stored in ROM contained in control unit 120.

The process is entered in step 601 where the TAD circuitry 132 monitors the telephone line for an incoming ring signal. From step 601, the process advances to decision 603 where it is determined whether an incoming ring signal has been detected. If no ring signal has been detected, the process returns to step 601 where it looks for an incoming ring signal. If an incoming ring signal is detected at step 603, however, the process advances to step 605 where a ring opcode is transmitted from the base unit to the handset unit. If the handset unit is then cradled in the base unit, the ring opcode is transmitted through the battery charge contacts to the handset unit. However, if the handset unit is removed from the base unit, the ring opcode is transmitted to the handset unit over the frequency channel previously selected and communicated by the base unit to the handset unit.

From step 605, the process advances to decision 606 where it is determined whether caller-ID information has been received along with the incoming ring signal. If caller-ID information has been received, the process advances to decision 607 where it is determined if a match is available in memory 129, shown in FIG. 4, which contains the caller-ID table. As earlier indicated herein, this caller-ID table has N number of telephone numbers which the user has previously identified and prerecorded a message to be associated with each incoming caller-ID recognized number.

From step 607, the process advances to step 609 where the base unit sends to the handset unit the prerecorded message matched to the caller-ID number. From decisions 606 and 607, respectively, when no caller-ID information is received or when no match is available in the caller-ID table for the received caller-ID information, the process advances to decision 611. From step 609, the process also advances to decision 611. At decision 611, a determination is made as to whether the call has been answered at the handset unit. If so, the process is exited. If a call has not been answered at this decision, however, the process advances to decision 612 where it is determined whether a preset number of rings selectable by the user has occurred. If the preset number of rings has not occurred, the process returns to decision 611 where it once again determines if the call has been answered at the handset unit. If the preset number of rings has occurred without the call being answered at the handset unit, the process advances to step 613 where the TAD function is activated and the base unit goes off-hook, generating an outgoing message in response to the incoming telephone call. From step 613, the process advances to step 614 where any incoming message is recorded by the TAD circuitry in the base unit. From step 614, the process is exited.

Referring next to FIG. 7, there is shown a flow chart illustrating the operation of the handset unit 20 with the desired functionality in accessing the TAD functions available in the base unit.

The process is entered in decision 701 where it is determined whether a ring opcode has been received from the base unit. The process continues to reside at this decision until such ring opcode is received. Once such a ring opcode has been received, the process advances to step 703 where the ringing function is activated in the handset unit. From step 703, and in accordance with the disclosed embodiment, the process advances to decision 705 where it determines if a loudspeaker flag has been set. This loudspeaker flag determines whether circuitry for the loudspeaker 341 should be activated when caller-ID information has been received with an incoming call which has a telephone number that matches a caller-ID number previously entered in the memory table in the base unit. For this operation, the message previously provided by the user of the telephone to himself or herself for identifying the calling person is played at the speakerphone in the handset unit. This loudspeaker flag also determines whether the loudspeaker circuitry should be activated when the TAD circuitry in the base unit goes off-hook and answers a telephone call. For this operation, the user is able to hear the outgoing message and any incoming message from the calling party without manually configuring the handset unit in any way during the TAD operation.

If the loudspeaker flag has been set in decision 705, the process advances to step 708 where the loudspeaker circuitry is activated. If the loudspeaker flag has not been set in decision 705, the process is exited.

Once the loudspeaker circuitry has been activated in step 708, the process advances to decision 710 where it is determined whether a prerecorded caller-ID matched message is being received. If such a message is being received, the process advances to step 712 where this message is played through the loudspeaker 341 in the recharge cradle. If no such message is being received as determined by decision 710, then the process advances to decision 714 where it is determined whether the call has been answered by a user at the handset unit going off-hook. If the call has not been answered, the process is exited at this decision.

If the call has not been answered at decision 714, the process advances to step 715 where the user is able to monitor the execution of the TAD functions through the loudspeaker. That is, the user is able to hear the outgoing prerecorded message and listen to any message being left by the calling party through the loudspeaker. Once the TAD function is complete, the process advances from step 715 to step 716 where the loudspeaker circuitry is deactivated. From step 716, the process is exited.

Referring next to FIG. 8, there is shown a front perspective view of of an alternative portable unit 80 and an alternative auxiliary charging cradle 85. Both the handset unit 80 and the auxiliary charging cradle are formed so that the handset unit 80 nests in the cradle portion of the charging cradle 85 with the buttons on the handset unit in an upwardly facing position, for easy access to these buttons. Thus, the features provided by switches 321 through 324, as earlier described herein, may be similarly provided through the buttons on this handset unit. Thus, the auxiliary charging cradle may, as shown in this alternative embodiment, be further simplified. Although not shown, in a manner similar to that of the handset unit 20 and the charging cradle 30, mating coupling devices on the back of the handset unit 80 and in the changing cradle 85 are provided for coupling the voice signal and information codes from the handset unit 80 to the charging cradle 85.

This handset unit 80 communicates with the base unit 10 though RF signals on a designated channel. An antenna 806 is used in communicating with the base unit. This handset unit incorporates a display 237 for the user to use in communicating with the base unit. This display could also show the caller-ID number of the calling party if desired by the user at the handset unit. Included in the charging cradle 85 is a loudspeaker 341 used for providing the auto monitor feature at the handset unit 80.

Various other modifications of this invention are contemplated and may obviously be resorted to by those skilled in the art without departing from the spirit and scope of the invention. By way of example, the above described coupling between said handset unit and said auxiliary charging cradle may alternatively be achieved through the use of metallic contacts in both units. Thus it is understood that other modifications of this invention may be achieved by those skilled in the art other than as specifically defined hereinafter by the appended claims.

I claim:

1. A cordless telephone system comprising:

a base unit for connecting to a telephone line and for receiving a ring signal over said line, said base unit including a telephone answering device for responding to an incoming ring signal detected on said line, and said base unit further including a first radio frequency transmitter and a first radio frequency receiver;

a handset unit with a second radio frequency transmitter and a second radio frequency receiver for respectively transmitting to the first receiver and receiving from the first transmitter in the base unit;

an auxiliary charging cradle for providing a source of energy for charging a battery in the handset unit when said handset unit is placed in the charging cradle, said charging cradle including loudspeaking means for audibly reproducing an incoming message being recorded in said telephone answering device;

coupling means between said handset unit and said auxiliary charging cradle for coupling signals between said handset unit and said auxiliary charging cradle; and control means for activating said loudspeaking means in response to said telephone answering device going to an off-hook state on said telephone line and for deactivating said loudspeaking means in response to said telephone answering device returning to an on-hook state.

2. The cordless telephone system of claim 1 wherein said base unit further includes a caller-ID device for identifying a caller-ID signal detected on said line and memory means for storing a telephone number for comparing with said caller-ID signal.

3. The cordless telephone system of claim 2 wherein said control means further includes means for activating said loudspeaking means in response to a favorable comparison between said caller-ID signal and said stored telephone number for audibly reproducing in the loudspeaking means said incoming message associated with said Caller-ID signal.

4. The cordless telephone system of claim 1 wherein said coupling means includes an optical source in said handset unit and an optical detector in said auxiliary charging cradle.

5. The cordless telephone system of claim 4 wherein said optical source is a light emitting diode and said optical detector is a photo diode.

6. The cordless telephone system of claim 1 wherein said coupling means includes an optical source in said auxiliary charging cradle and an optical detector in said handset unit.

7. The cordless telephone system of claim 6 wherein said optical source is a light emitting diode and said optical detector is a photo diode.

8. A method of communicating with a cordless telephone having a base unit and a handset unit, the method comprising the steps of:

connecting the base unit to a telephone line for receiving a ring signal over said line, said base unit including a telephone answering device for responding to a ring signal detected on said line, and said base unit further including a first radio frequency transmitter and a first radio frequency receiver;

communicating with said base unit in the handset unit, the handset unit having a second radio frequency transmitter and a second radio frequency receiver for respectively transmitting signals to the first receiver and receiving signals from the first transmitter in the base unit, providing a loudspeaker in an auxiliary charging cradle for audibly reproducing an incoming message being recorded in said telephone answering device;

coupling signals from said handset unit to said auxiliary charging cradle; and activating said loudspeaker in response to said telephone answering device going to an off-hook state on said telephone line and deactivating said loudspeaker in response to said telephone answering device returning to an on-hook state.

9. The method of communicating with a cordless telephone as in claim 8 wherein said base unit further includes a caller-ID device for identifying a caller-ID signal detected on said line and a memory for storing a telephone number for comparing with said caller-ID signal.

10. The method of communicating with a cordless telephone as in claim 9 further including the step of activating said loudspeaker in response to a favorable comparison between said caller-ID signal and said stored telephone number for audibly reproducing in the loudspeaker said incoming message associated with said caller-ID signal.

11. The method of communicating with a cordless telephone as in claim 8 wherein said coupling step includes providing an optical source in said handset unit and an optical detector in said auxiliary charging cradle.

12. The method of communicating with a cordless telephone as in claim 11 wherein said optical source is a light emitting diode and said optical detector is a photo diode.

13. The method of communicating with a cordless telephone as in claim 8 wherein said coupling step includes providing an optical source in said auxiliary charging cradle and an optical detector in said handset unit.

14. The method of communicating with a cordless telephone as in claim 13 wherein said optical source is a light emitting diode and said optical detector is a photo diode.

15. A cordless telephone system comprising:

a base unit for connecting to a telephone line and for receiving a ring signal over said line, said base unit including a telephone answering device for responding to an incoming ring signal detected on said line, and said base unit further including a first radio frequency transmitter and a first radio frequency receiver;

a handset unit with a second radio frequency transmitter and a second radio frequency receiver for respectively transmitting signals to the first receiver and receiving signals from the first transmitter in the base unit;

an auxiliary charging cradle with a loudspeaker for audibly reproducing an incoming message being recorded in said telephone answering device;

coupling means between said handset unit and said auxiliary charging cradle for coupling signals from said handset unit to said auxiliary charging cradle; and control means for activating said loudspeaker in response to said telephone answering device going to an off-hook state on said telephone line and for deactivating said loudspeaker in response to said telephone answering device returning to an on-hook state.

16. The cordless telephone system of claim 15 wherein said base unit further includes a caller-ID device for identifying a caller-ID signal detected on said line and memory means for storing a telephone number for comparing with said caller-ID signal.

17. The cordless telephone system of claim 15 wherein said control means further includes means for activating said loudspeaker in response to a favorable comparison between said caller-ID signal and said stored telephone number for audibly reproducing in the loudspeaker said incoming message associated with said Caller-ID signal.

18. A cordless telephone system comprising:

a base unit for connecting to a telephone line and for receiving a ring signal over said line, said base unit including a caller-ID device for identifying a caller-ID signal detected on said line, a telephone answering device for responding to an incoming ring signal detected on said line, and said base unit further including a first radio frequency transmitter and a first radio frequency receiver;

a handset unit with a second radio frequency transmitter and a second radio frequency receiver for respectively transmitting signals to the first receiver and receiving signals from the first transmitter in the base unit;

an auxiliary charging cradle with a loudspeaker for audibly reproducing an incoming message being recorded in said telephone answering device;

coupling means between said handset unit and said auxiliary charging cradle for coupling signals from said handset unit to said auxiliary charging cradle; and control means for activating said loudspeaker in response to both said telephone answering device going to an off-hook state on said telephone line and a favorable comparison being provided between said caller-ID signal and said stored telephone number for audibly reproducing in the loudspeaker said incoming message associated with said Caller-ID signal.

19. The cordless telephone system of claim 18 wherein said control means further includes means for deactivating said loudspeaker in response to said telephone answering device returning to an on-hook state.

20. The cordless telephone system of claim 1 wherein said coupling means includes metallic connectors in both said handset unit and said auxiliary charging cradle.

* * * * *